(12) United States Patent
Saito et al.

(10) Patent No.: US 7,076,958 B2
(45) Date of Patent: *Jul. 18, 2006

(54) MAGNETIC MATERIAL

(75) Inventors: Akiko Saito, Kawasaki (JP); Tadahiko Kobayashi, Yokohama (JP); Takao Sawa, Yokohama (JP); Masashi Sahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

This patent is subject to a terminal disclaimer.

(21) Appl. No.: 10/718,518

(22) Filed: Nov. 24, 2003

(65) Prior Publication Data

US 2005/0000230 A1    Jan. 6, 2005

Related U.S. Application Data

(63) Continuation of application No. 10/098,568, filed on Mar. 18, 2002, now Pat. No. 6,676,772.

(30) Foreign Application Priority Data

Mar. 27, 2001   (JP)   ............................. 2001-090953

(51) Int. Cl.
*F25B 21/00*   (2006.01)
*C09K 5/00*   (2006.01)
*H01F 1/04*   (2006.01)

(52) U.S. Cl. ............................. 62/3.1; 252/67; 148/301

(58) Field of Classification Search ................... 62/3.1; 252/67; 148/301
See application file for complete search history.

(56) References Cited

U.S. PATENT DOCUMENTS 3,841,107 A * 10/1974 Clark ............................. 62/3.1
4,332,135 A *  6/1982 Barclay et al. ............... 62/3.1
4,408,463 A * 10/1983 Barclay ........................ 62/3.1

(Continued)

FOREIGN PATENT DOCUMENTS

JP            61-183441         8/1986

OTHER PUBLICATIONS

C. Zimm, et al., Advances in Cryogenic Engineering, vol. 43, pp. 1759-1766, "Description and Performance of a Near-Room Temperature Magnetic Refrigerator", 1998.

(Continued)

*Primary Examiner*—William C. Doerrler
(74) *Attorney, Agent, or Firm*—Oblon, Spivak, McClelland, Maier & Neustadt, P.C.

(57) ABSTRACT

The magnetic material for magnetic refrigeration of the present invention is characterized by exhibiting, in a certain temperature region, preferably, only in part of a temperature region from 200 K to 350 K, an inflection point at which a second order differential coefficient of a magnetization curve changes from positive to negative with respect to a magnetic field, within the range of this magnetic field formed using a permanent magnet unit. This magnetic material of the present invention can generate a low temperature by using a relatively low magnetic field, by transferring the entropy between the electron spin system and the lattice system near the temperature at which an inflection point appears on the magnetization curve. Examples of the magnetic material meeting this condition are $La(Fe,Si)_{13}$, $(Hf,Ta)Fe_2$, $(Ti,Sc)Fe_2$, and $(Nb,Mo)Fe_2$, each containing 50 to 60 atomic % of transition metals such as Fe.

24 Claims, 8 Drawing Sheets

U.S. PATENT DOCUMENTS

| | | | |
|---|---|---|---|
| 4,785,636 A * | 11/1988 | Hakuraku et al. | 62/3.3 |
| 5,060,478 A * | 10/1991 | Fukamichi | 62/3.1 |
| 5,182,914 A * | 2/1993 | Barclay et al. | 62/3.1 |
| 5,362,339 A * | 11/1994 | Horimura et al. | 148/403 |
| 5,381,664 A | 1/1995 | Bennett et al. | |
| 5,462,610 A * | 10/1995 | Gschneidner et al. | 148/301 |
| 5,641,424 A * | 6/1997 | Ziolo et al. | 252/67 |
| 5,743,095 A * | 4/1998 | Gschneidner et al. | 62/3.1 |
| 6,334,905 B1 * | 1/2002 | Hanawa et al. | 148/23 |
| 6,334,909 B1 | 1/2002 | Okamura et al. | |
| 6,676,772 B1 * | 1/2004 | Saito et al. | 148/301 |
| 2002/0053209 A1 * | 5/2002 | Zimm et al. | 62/3.1 |

OTHER PUBLICATIONS

X. Bohigas, et al., IEEE Transactions on Magnetics, vol. 36, No. 3, pp. 583-544, "Room-Temperature Magnetic Refrigerator Using Permanent Magnets", May 2000.

F. Hu, et al., J. Phys. Condens. Matter 12, pp. L691-L696, "Magnetic Entropy Change in $La(Fe_{0.08}Co_{-0.02})_{11.7}Al_{1.3}$", Oct. 2000.

X. X. Zhang, et al., Applied Physics Letters, vol. 77, No. 19, pp. 3072-3074, "Magnetic Entropy Change in Fe-Based Compound $LaFe_{10.6}Si_{2.4}$", Nov. 6, 2000.

* cited by examiner

MAGNETIC MATERIAL

The present application is a continuation of application Ser. No. 10/098,568 filed Mar. 18, 2002 now U.S. Pat. No. 6,676,772.

CROSS-REFERENCE TO RELATED APPLICATIONS

This application is based upon and claims the benefit of priority from the prior Japanese Patent Application No. 2001-090953, filed Mar. 27, 2001, the entire contents of which are incorporated herein by reference.

BACKGROUND OF THE INVENTION

1. Field of the Invention

The present invention relates to a magnetic material and, more particularly, to a magnetic material capable of realizing magnetic refrigeration using a relatively low magnetic field in near room temperature region.

2. Description of the Related Art

Presently, a gas compression/expansion cycle is primarily used in refrigeration systems, e.g., refrigerators, freezers, and air-conditioners, closely related to daily human life. However, this gas compression/expansion cycle is environmentally problematic, in terms of the exhaustion of specific freon gases. In addition, substitute freon gases presumably have a bad effect on the environment. From this background, clean and efficient refrigeration technologies causing no environmental problems due to wastage of operating gases are being demanded to put into practical use.

Recently, magnetic refrigeration is being increasingly expected as one such environment-friendly, highly efficient refrigeration technology. Much research and development of the related technologies for use in near room temperature region has been undertaken. Magnetic refrigeration generates low temperatures as follows by applying the magnetocaloric effect (a phenomenon in which when an external magnetic field is changed with respect to a magnetic material while the magnetic material is thermally insulated, the temperature of this magnetic material changes).

The entropy of a magnetic material is changed depending on whether a magnetic field is applied or not, owing to the difference between the degrees of freedom of the electron spin system. With this entropy change, the entropy transfers between the electron spin system and the lattice system. Magnetic refrigeration uses a magnetic material having a large electron spin and produces a large entropy change between the magnetic field applied state and the magnetic field removed state. Using this large entropy change, magnetic refrigeration generates low temperatures.

Note that in a temperature region of 1 K or more, a "magnetic material" usually means a substance which shows magnetism due to an electron spin. On the other hand, in a temperature region of a few mK or less, magnetism due to a nuclear spin becomes relatively large. For example, an ultra low temperature of 27 μK was reportedly generated by using $PrNi_5$. In the following description, a "magnetic material" means a substance showing magnetism due to an electron spin, and a target temperature region is 1 K or more, unless otherwise specified.

In the early 1900s, magnetic refrigeration systems using paramagnetic salts such as $Gd_2(SO_4)_{3.8}H_2O$ and paramagnetic compounds represented by $Gd_3Ga_5O_{12}$ (gadolinium gallium garnet "GGG") were developed. However, these magnetic refrigeration systems using paramagnetic materials were in most cases applied to an low temperature region of 20 K or less for the following reason. That is, as the lattice vibration increases with an increase in temperature, the higher magnetic field is required to reduce the lattice vibration by entropy transferring between electron spin system and lattice system. Therefore, assuming a magnetic field of about 10 tesla which can be obtained using an ordinary type superconducting magnet, temperatures at which magnetic refrigeration can be achieved using paramagnetic materials are limited to the low temperature region of 20 K or less.

On the other hand, to realize magnetic refrigeration at higher temperatures, the research of magnetic refrigeration using the magnetic phase transition of a ferromagnetic material between a paramagnetic state and a ferromagnetic state was extensively made after the 1970s. As a consequence, a large number of magnetic materials containing rare earth elements having a large electron magnetic spin per unit volume have been proposed. Examples are lanthanoide rare earth elements such as Pr, Nd, Dy, Er, Tm, and Gd, rare earth alloy materials containing two or more rare earth elements such as Gd—Y and Gd—Dy, and rare earth intermetallic compounds such as $RAl_2$ (R represents a rare earth element, and this similarly applies to the following description), $RNi_2$, and GdPd.

When any of these ferromagnetic substances are used, an external magnetic field is applied at a temperature close to the ferromagnetic phase transition temperature (Curie temperature; Tc), thereby causing the magnetic phase transition of electron spin system from a paramagnetic state to a ferromagnetic ordered state. Magnetic refrigeration is realized by using the resulting entropy change. Therefore, the applicable temperature range is limited to the vicinity of the ferromagnetic phase transition temperature (Tc) of each magnetic material. However, the magnitude of the external magnetic field need only be the one enough to assisting a magnetic phase transition. A magnetic field of this magnitude can be well generated in a temperature region much higher than 20 K.

In 1974, Brown (U.S.A.) achieved magnetic refrigeration at room temperature for the first time, by using a ferromagnetic substance Gd plate having a ferromagnetic phase transition temperature (Tc) of about 294 K. Unfortunately, although the refrigeration cycle was continuously operated in the experiment, there were some problems such as heat transfer in a refrigeration cycle, because an integral Gd plate was used in the range of the hot end to the cold end.

Magnetic refrigeration in the range of intermediate temperatures much higher than 20 K to room temperature has a substantial problem. That is, lattice vibration becomes large as the temperature rises, so, in a temperature region of 100 to 150 K or more the lattice system entropy becomes large compared with the magnetic entropy of the electron spin system. Accordingly, even when the entropy is exchanged between the electron spin system and the lattice system by changing the magnitude of the external magnetic field, the magnetocaloric effect, i.e., a temperature reduction (ΔTad) of the magnetic substance is small.

In 1982, Barclay (U.S.A.) attempted to use the lattice entropy positively that had been regarded as an interference to magnetic refrigeration in the range of intermediate temperatures to room temperature (or a temperature range in which the lattice entropy is large relative to the magnetic entropy), and proposed a method of refrigeration (U.S. Pat. No. 4,332,135) in which a magnetic material is used, in addition to magnetic refrigeration by the magnetocaloric effect, as the regenerator for storing coldness generated by the refrigeration. This magnetic refrigeration method is called AMR ("Active Magnetic Refrigeration").

In 1997, Zimm, Gschneidner, and Pecharsky of the U.S.A. built a prototype AMR machine using a packed column filled with fine spherical Gd, and succeeded in a continuous steady-state operation of the magnetic refrigeration cycle at room temperature ("Advances in Cryogenic Engineering", Vol. 43, 1998). According to this reference, refrigeration at about 30° C. was accomplished by changing the magnitude of the external magnetic field from 0 to 5 tesla by using a superconducting magnet at room temperature. When the refrigerating temperature difference ($\Delta$T) between the hot end and the cold end was 13° C., a very high refrigeration efficiency (COP=15; excluding the power input to the magnetic field generating means) was reportedly obtained. Note that the refrigeration efficiency (COP) of a gas compression/expansion cycle (e.g., a household refrigerator) using conventional freon is about 1 to 3.

In addition to the above-mentioned technical demonstration of the AMR-cycle magnetic refrigeration system using Gd, Pecharsky and Gschneidner of the U.S.A. developed a $Gd_5(Ge,Si)_4$-based material as a magnetic material from which a very large entropy change can be obtained at room temperature (U.S. Pat. No. 5,743,095). For example, $Gd_5(Ge_{0.5}Si_{0.5})_4$ shows an entropy change ($\Delta$S) of about 20 J/(kg. K) when the magnitude of the external magnetic field is changed from 0 to 5 tesla at about 277 K, and shows an entropy change ($\Delta$S) of about 15 J/(kg. K) when the magnitude of the external magnetic field is changed from 0 to 2 tesla. That is, a large entropy change twice or more that of Gd is observed near room temperature.

Unfortunately, in the experiments conducted by Zimm, Gschneidner, and Pecharsky described above, a superconducting magnet was used to apply a large external magnetic field of about 2 to 5 tesla to Gd as a magnetic material for magnetic refrigeration. Since under the present conditions a cryogenic environment at about 10 K is necessary to operate a superconducting magnet, the system increases in size. In addition, when a superconducting magnet is to be used, it is necessary to use a freezing medium such as liquid helium or a refrigerator for cryogenic generation. It is impractical to apply a system like this to ordinary purposes such as refrigeration and air-conditioning.

A heavy duty electromagnet is another means for generating a large magnetic field, other than a superconducting magnet. When this electromagnet is to be used, however, a large input current and water cooling against Joule heating are necessary. This makes the system larger and also increases the operation cost. Accordingly, similar to the case of a superconducting magnet, it is impractical to apply a system using an electromagnet for usual purposes.

A permanent magnet is a small convenient magnetic field generating means. However, it is difficult to generate a large magnetic field of about 2 to 5 tesla using such a magnet. According to the reported results of experiments using an NdFeB-based permanent magnet and Gd as a magnetic material for magnetic refrigeration, the cooling temperature at room temperature is very low, 1.6° C., because the magnitude of the magnetic field is small. This greatly differs from the refrigerating ability of the conventional gas compression/expansion cycle.

BRIEF SUMMARY OF THE INVENTION

The present invention has been made in consideration of the problems of the magnetic refrigeration technologies in near room temperature region. It is an object of the present invention to provide a magnetic material for magnetic refrigeration, by which magnetic refrigeration can be realized using a relatively low magnetic field.

The magnetic material of the present invention is characterized by exhibiting, in a certain temperature region (only in a partial temperature region), an inflection point at which a second order differential coefficient of a magnetization curve changes from positive to negative with respect to a magnetic field, within the range of the strength of the magnetic field obtained using a permanent magnet.

Preferably, the magnetic material of the present invention is characterized by exhibiting, only in part of the temperature region from 200 K to 350 K, the above-mentioned inflection point on a magnetization curve within the range of the strength of a magnetic field of 1 tesla or less.

In the present invention, an external magnetic field is applied using a permanent magnet unit, near a temperature indicating the inflection point, to a magnetic material having a magnetization curve meeting the above condition. Magnetic refrigeration can be realized by transferring entropy between the electron spin system and the lattice system by changing the magnitude of the external magnetic field.

The inventors of the present application found that within the range of near room temperature from 200 K to 350 K (i.e., temperatures closely related to everyday life, e.g., from the temperature of dry ice to that of hot water), and within the range of the strength of a relatively low magnetic field of 1 tesla or less, it is effective to urge a ferromagnetic interaction and an antiferromagnetic interaction to compete with each other, as a means for obtaining the inflection point as described above on a magnetization curve.

The reason why the above-mentioned inflection point appears on a magnetization curve is presumably as follows. By urging a ferromagnetic interaction and an antiferromagnetic interaction to compete with each other, several electronic states having close energy levels are formed. The relation of the energy levels of each electronic states changes in accordance with the amplitude of the external magnetic field. Hence, upon application of a magnetic field, the magnetic spin configuration partly or entirely changes inside the material system. As a consequence, the inflection point appears on a magnetization curve.

The important point is that in near room temperature region from 200 K to 350 K, several electronic state is in very close energy level. A large entropy change cannot be obtained, i.e., efficient magnetic refrigeration cannot be realized by the application of a relatively low magnetic field, unless this special condition is formed.

In addition, when magnetic refrigeration is actually performed using a magnetic material, not only the magnitude of an entropy change $\Delta$S(T, $\Delta$H) corresponding to a magnetic field change ($\Delta$H), but also a temperature range with which the peak of the entropy change appears is an important factor. That is, even when a large entropy change is obtained, if this entropy change is obtained only within a very narrow temperature range (e.g., about 1 to 2 K), the magnetic refrigeration cycle cannot be stably operated. More specifically, a stable refrigeration cycle cannot be achieved, or even if it can be achieved, is impractical for use in a refrigerator.

In the case of the AMR, for example, a magnetic material works as not only the magnetic refrigerant but also the regenerator, so a temperature gradient is generated inside a magnetic refrigeration chamber when the refrigeration cycle is operated in a steady state. That is, even when the temperature of the magnetic material is almost uniform in the magnetic refrigeration chamber at the beginning of the operation, a temperature gradient is gradually formed in the magnetic refrigeration chamber as the refrigeration cycle is repeated. This makes the two end portions of the magnetic refrigeration chamber become hot and cold ends. Consequently, the magnetic material in the magnetic refrigeration chamber operates at temperature cycles of different ranges at different positions. In a steady-state operation, these temperature cycles are also in a steady state. If the magnetic material is the one with which the peak of an entropy change appears only within a very narrow temperature range (e.g., 1 to 2 K), a refrigeration cycle is achieved only within this narrow temperature range. Accordingly, it is difficult to perform stable operation in a large refrigeration temperature difference (e.g., 10 K to 20 K or a larger range) using such a material.

Note that it is also possible to arrange magnetic materials exhibiting the peak of an entropy change in different temperature regions, in accordance with this temperature gradient during a steady-state operation, from the hot end to the cold end of the magnetic refrigeration chamber. However, the steady state is gradually approached through different temperature cycles as the refrigeration cycle is repeated from the start of operation. Therefore, each magnetic material must be a substance by which an entropy change appears within a temperature range wider than the temperature amplitude during steady-state operation.

For the reasons described above, a magnetic material for magnetic refrigeration must have a large entropy change and a wide temperature range (width) over which a peak appears in an entropy change. Note that the temperature width of the peak of an entropy change means the bottom width of the peak, not the half-width. This is so because the effective temperature width of the peak has an effect in an actual temperature cycle. This effective temperature width of the peak is a peak width obtained by removing an error level from the bottom portion.

Letting $\Delta S(T, \Delta H)$ be an entropy change (temperature dependence) at a temperature T with respect to a specific external magnetic field change $\Delta H$ and $\Delta S_{max}$ be the peak value of $\Delta S$, the effective temperature width of the peak is defined as follows: the range of the temperature T within which $\Delta S(T, \Delta H) > 0.1 * \Delta S_{max}$, when a value which is $\frac{1}{10}$ of $\Delta S_{max}$ is a bottom level reference, or, if $0.1 * \Delta S_{max} > 1$ [J/(kg,K)] is met, the range of the temperature T within which $\Delta S(T, \Delta H) > 1$ [J/(kg,K)], regarding 1 [J/(kg,K)] as a bottom level reference.

To realize a magnetic refrigeration cycle by using a single magnetic material, the effective temperature width of the peak of the entropy change $\Delta S(T, \Delta H)$ must be 3 K or more. This effective temperature width is preferably about 5 K or more, and more preferably, 8 K or more.

Additionally, the peak of the entropy change described above preferably has no temperature hysteresis. Even if the peak has a temperature hysteresis, this hysteresis is 8 K or less, preferably, 3 K or less, and more preferably, 1 K or less.

However, the research to-date reveal that an entropy change and the temperature width of its peak often have a tradeoff relationship. Therefore, it is important to obtain a good balance between them.

If the peak width of an entropy change is as narrow as about 1 to 2 K, giving a slight composition fluctuation is effective as a means for widening the peak width so that the peak width becomes a practical one. By giving this slight composition fluctuation, it is possible to slightly change the energy level balance of electronic state in microscopic portions, without largely changing the physical characteristics of a magnetic material, and to distribute a temperature at which the inflection point appears within a microscopic region. As a consequence, the peak width of an entropy change in a magnetic material can be increased.

When the metal texture is taken into consideration, the peak width of an entropy change can also be increased, without largely changing the physical characteristics of a magnetic material as described above, by precipitating a small amount of a second phase, having a crystal structure different from that of a main phase, with respect to this main phase. Practically no problem arises if the amount of this second phase is 30 vol % or less. This can increase the peak width of $\Delta S$.

Examples of practical methods are to use a preparation composition slightly different from a predetermined composition, slightly add additional elements, and rapidly cool a metal in a molten state during synthesis.

To obtain a large entropy change, the internal system of magnetic material must have large degree of freedom. To increase the degree of freedom of internal magnetic system of a magnetic material, it is preferable to use transition metal elements such as Fe, Ni, Co, Mn, and Cr, or rare earth elements such as Pr, Nd, Gd, Tb, Dy, Er, Ho, or Tm, as main constituent elements.

Furthermore, to obtain the inflection point as described above on a magnetization curve within the range of a magnetic field of 1 tesla or less in near room temperature region of about 200 K to about 350 K, it is effective to add a total of 50 atomic % or more of one or more of Fe, Ni, Co, Mn, and Cr. This is so because, if the ratio of a transition metal element such as Fe is low, it becomes difficult to make the above inflection point appear in a high-temperature region of 200 K or more with a magnetic field of 1 tesla or less.

When Gd, Sm, or Tb having a relatively strong magnetic interaction among other rare earth elements is used, the total amount of this element and a transition metal element such as Fe, Co, Ni, Mn, or Cr enumerated above is preferably 60 atomic % or more, in order to make the above inflection point appear at a temperature of 200 K or more.

A magnetic material meeting the above condition is, e.g., a magnetic material which comprises a total of 50 to 96 atomic % of one element or two or more elements selected from the group consisting of Fe, Co, Ni, Mn, and Cr, a total of 4 to 43 atomic % of one element or two or more elements selected from the group consisting of Si, C, Ge, Al, B, Ga, and In, and a total of 4 to 20 atomic % of one element or two or more elements selected from the group consisting of Y, La, Ce, Pr, Nd, Sm, Eu, Gd, Tb, Dy, Ho, Er, Tm, and Yb.

In the second group, Si or Ge is preferred, and 4 to 25 atomic % of Si are particularly preferred.

Representative examples of this magnetic material are $R(T,M)_{13}$, $R(T,M)_{12}$, $R_2(T,M)_{17}$, and $R_3(T,M)_{29}$ (R is a rare earth element, T is a transition element, and M is the above element of group 3B or 4B). This magnetic material is particularly preferably $(La,Pr,Ce,Nd)(Fe,T,Si)_{13}$ or $(La,Pr,Ce,Nd)(Fe,T,Si,M)_{13}$.

Another magnetic material meeting the above condition is, e.g., a magnetic material which comprises a total of 60 to 96 atomic % of one element or two or more elements selected from the group consisting of Fe, Co, Ni, Mn, and Cr, and a total of 4 to 40 atomic % of one element or two or more elements selected from the group consisting of Sc, Ti, Y, Zr, Nb, Mo, Hf, Ta, and W. Note that two or more elements are particularly preferably selected from the second group.

In this second group, Ti, Zr, Nb, and Hf are particularly favorable, and their total amount is preferably 25 atomic % or more.

A representative example of this magnetic material is $(Hf,Ta)Fe_2$, $(Ti,Sc)Fe_2$, and $(Nb,Mo)Fe_2$.

From a viewpoint of practical use, a magnetic material for magnetic refrigeration should better exhibit large change in magnetic entropy per weight or per volume to minimize the weight and volume of refrigeration systems. In addition, from another viewpoint of practical use, it should preferably exhibit large change in magnetic entropy per unit magnetic moment. The reason is as follows. In the gradient of magnetic field, a magnetic material is affected by external force (magnetic force) which is proportional to the magnetic moment of the material. The magnetic force is one of the disturbance factors in practical use when the relative position between the magnetic material and the permanent magnet is controlled.

A magnetic material meeting the above condition is, e.g., a magnetic material which comprises a total of 50 to 80 atomic % of one or not less than two elements selected from the group consisting of Fe, Co, Ni, Mn, and Cr, a total of 20 to 50 atomic % of one or not less than two elements selected from the group consisting of Sb, Bi, P, and As.

Representative examples of this magnetic material are $(Mn,Cr)_2(Sb,As,P)$, $(Mn,Cr)(Sb,As,P,Bi)$, $(Co,Mn,Fe,Ni)_2(P,As)$, and $(Fe,Co,Mn)_3P$. This magnetic material is particularly preferably $(Mn,Cr)_2Sb$, $(Mn,Cr)Sb$, $(Co,Mn)_2P$, and $(Fe,T)_2(P,As)$.

To control the electronic state subtly, it is effective to substitute a part (below 10%) of 3B transition element such as Fe, Co, Ni, Mn or Cr with 4B transition element such as Rh or Pd. In addition, a part (below 20%) of 5B transition element such as Sb, Bi, P and As is substituted for light element such as B or C, to control the electronic state subtly.

If the content of oxygen is large in the manufacture of the above magnetic material, this oxygen and a metal element combine to form a refractory oxide in a melting step (of melting and mixing materials). This oxide floats as a refractory impurity in the molten metal layer, and reduces the quality of the material manufactured in the melting step and resolidification step. To minimize the formation of this oxide, therefore, the oxygen content is preferably decreased to 1 atomic % or less.

In the magnetic material of the present invention, the inflection point as described above appears within the range of a relatively low magnetic field. Accordingly, a magnetic refrigeration system can be realized by using a small permanent magnet unit, without using any superconducting magnet or electromagnet having a large current capacitance, near a temperature at which the inflection point appears.

DETAILED DESCRIPTION OF THE INVENTION

Several examples of a magnetic material based on the present invention will be explained below.

EXAMPLE 1

Seven types of magnetic materials having the following compositions were manufactured, and these materials were tested for their magnetization curves and entropy changes due to the change in external magnetic field. In the following specimens, specimens 1 to 4 are magnetic materials based on the present invention, and specimens 5, 6, and 7 are comparative examples.

Specimen 1: $Fe_{81.7}Si_{11.1}La_{7.2}$
Specimen 2: $Fe_{80.8}Si_{12.1}La_{7.1}$
Specimen 3: $Fe_{82.6}Co_{0.9}Si_{9.3}La_{7.2}$
Specimen 4: $Fe_{81.7}Si_{10.2}Ga_{0.9}La_{7.2}$
Specimen 5: $Fe_{69.7}Al_{23.2}La_{7.1}$
Specimen 6: $Fe_{75.8}Si_{17.1}La_{7.1}$
Specimen 7: $Gd_{95}Y_5$ After these materials having the above compositions were adjusted by arc melting, they were subjected to uniformization annealing in a vacuum at a temperature of 900° C. to 1,100° C. for two weeks. These specimens thus manufactured were tested for their magnetization curves.

Figure 1:
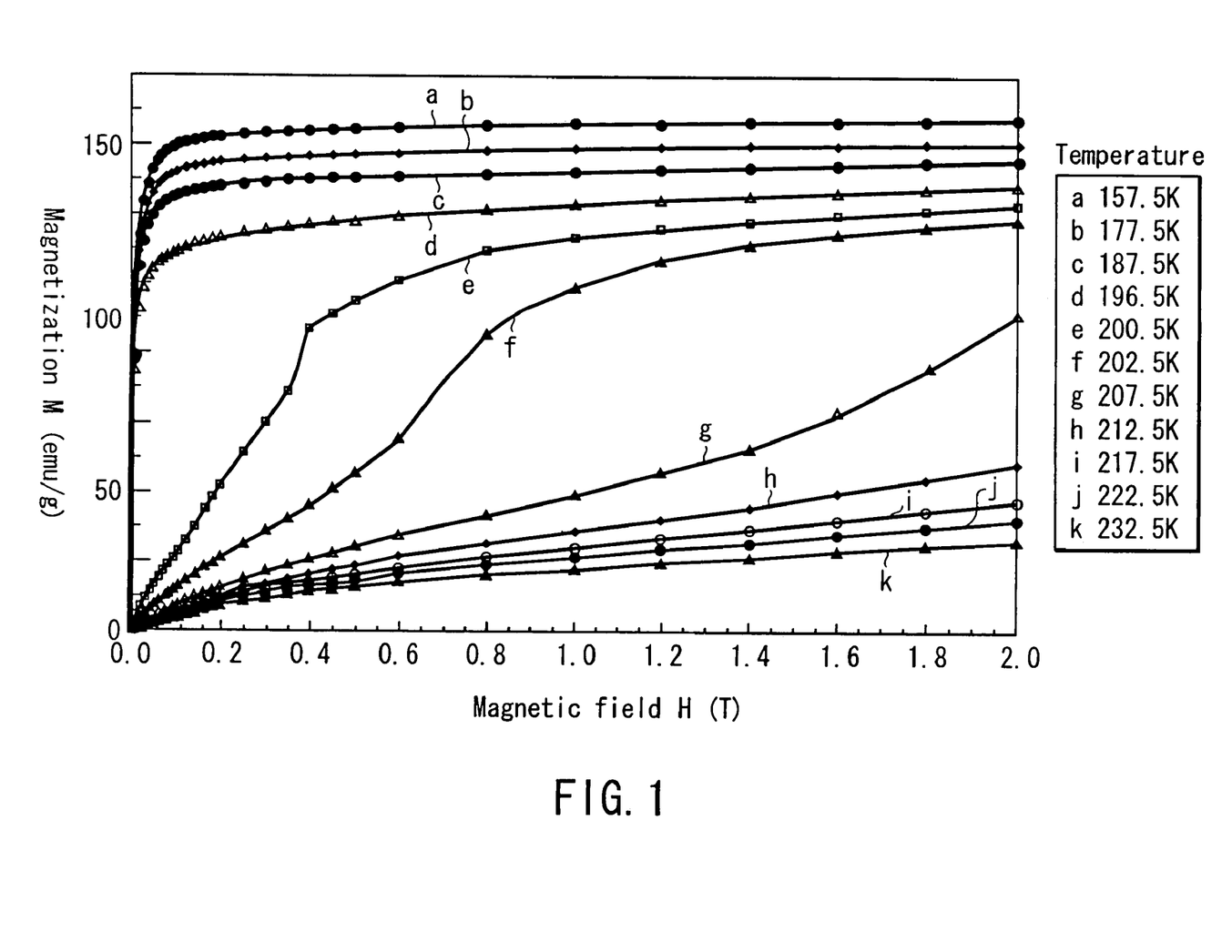
FIG. 1 is a graph showing examples of the magnetization curves of a magnetic material (specimen 1) based on the present invention.
Figure 2:
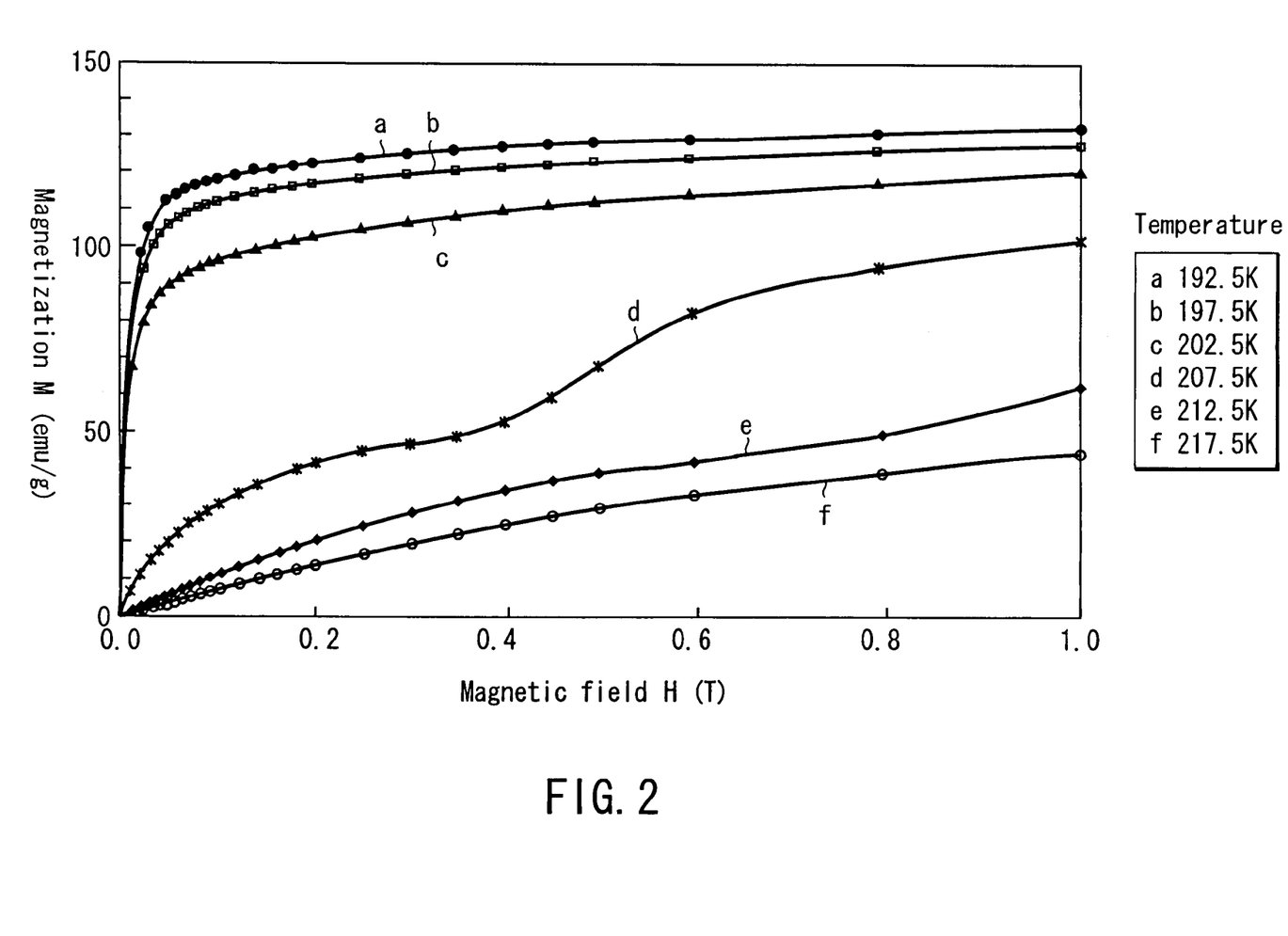
FIG. 2 is a graph showing examples of the magnetization curves of a magnetic material (specimen 4) based on the present invention.
Figure 3:
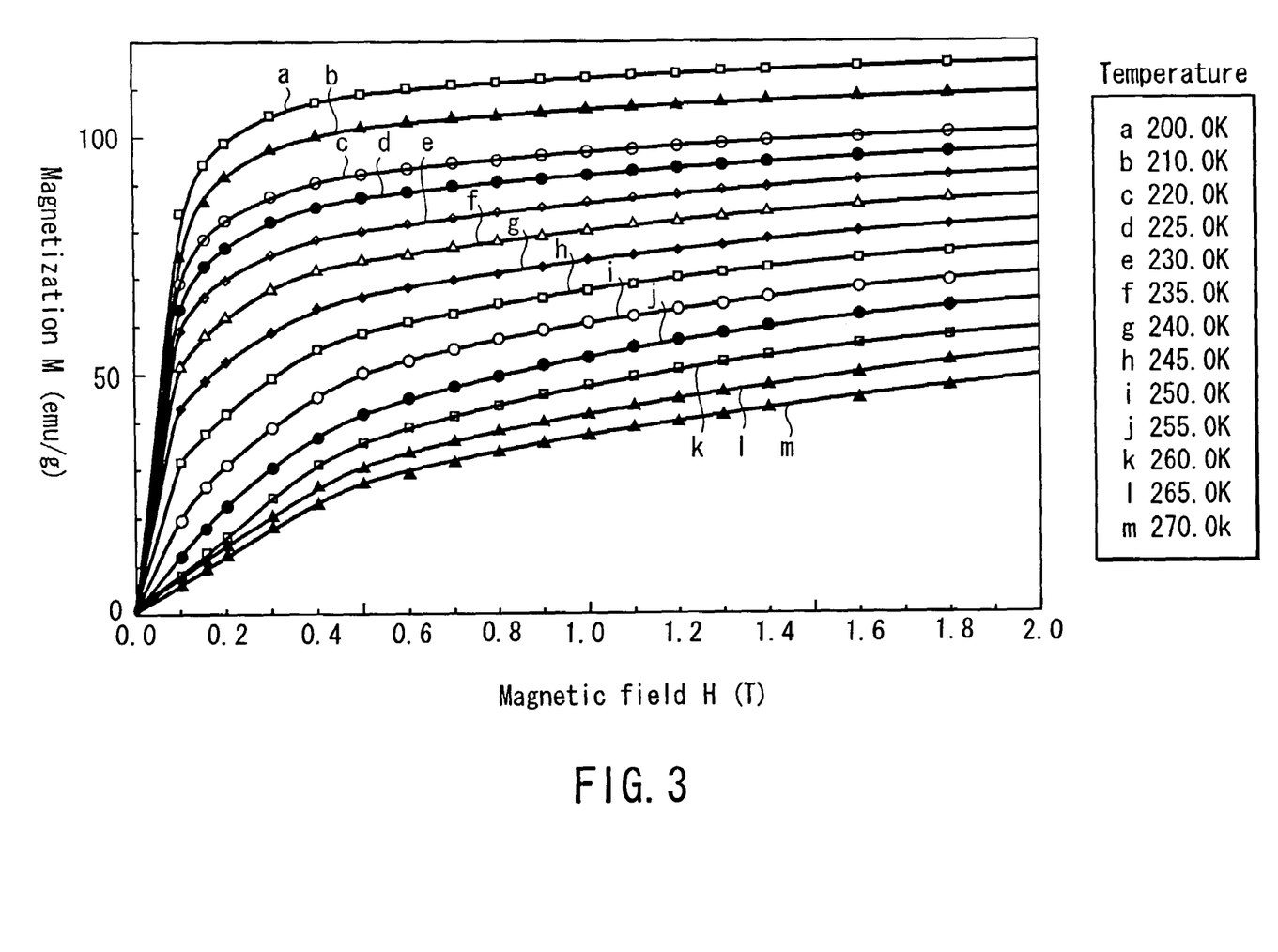
FIG. 3 is a graph showing examples of the magnetization curves of a magnetic material (specimen 6) used as a comparative example.

FIG. 1 shows the magnetization curves of specimen 1 at temperatures of 157.5 K to 232.5 K. FIG. 2 shows the magnetization curves of specimen 4 at temperatures of 192.5 K to 217.5 K. FIG. 3 shows the magnetization curves of specimen 6 at temperatures of 200 K to 270 K.

The magnetization curves of specimen 1 (FIG. 1) indicate that the magnetic moment abruptly increased by a relatively low external magnetic field in a temperature region lower than T=196.5 K, and, within the range of a magnetic field of 1 tesla or less, a second order differential coefficient of the magnetic moment was negative with respect to the magnetic field (upward convex shape) (symbols a to d in FIG. 1).

The shape of this magnetization curve largely changed near T=200 K. When T=200.5 K (symbol e) and 202.5 K (symbol f), the value of the magnetic moment was small with respect to a very low magnetic field of about 0.01 tesla. As the magnetic field increased, however, the magnetic moment abruptly increased near the magnetic field H=0.35 tesla and H=0.6 tesla, and an inflection point appeared on the magnetization curve. After passing through this inflection point, the increase in the magnetic moment reduced. The value of the magnetic field when this inflection point appeared on the magnetization curve will be represented by Hc hereinafter.

As the temperature was further raised, Hc increased, and the change in the magnetic moment near Hc reduced. When the temperature was higher than T=207.5 K (symbol g), the range of the magnetic field within which the magnetic moment increased near Hc broadened and gradually disappeared (symbols h to k in FIG. 1).

The magnetization curves of specimen 4 (FIG. 2) show that the magnetic moment abruptly increased by a relatively low external magnetic field in a temperature region lower than T=202.5 K, and, within the range of a magnetic field of 1 tesla or less, a second order differential coefficient of the magnetic moment with respect to the magnetic field was negative (upward convex shape) (symbols a to c in FIG. 2).

The shape of this magnetization curve largely changed near T=207.5 K. When T=207.5 K (symbol d), the magnetization curve exhibited concave shape (the second order differential coefficient was positive) near the magnetic field H=0.3 tesla to H=0.4 tesla. The magnetization curve turned to a upward convex shape when the magnetic field H=0.5 tesla or more. That is, an inflection point appeared on the magnetization curve near the magnetic field H=0.45 tesla.

Note that similar magnetization curves were observed for specimens 2 and 3: an inflection point appeared within the range of a magnetic field of 1 tesla or less near T=207 K for specimen 2 and T=230 K for specimen 3.

In contrast, the magnetization curves of specimen 6 (FIG. 3) reveal that the value of the magnetic moment largely changed near the magnetic phase transition temperature, but, within the range of a magnetic field of 1 tesla or less, a second order differential coefficient of the magnetic moment with respect to this magnetic field was always negative, so there was no large change in the shape (upward convex shape) of the magnetization curve. Note that similar magnetization curves were observed for specimens 5 and 7: within the range of a magnetic field of 1 tesla or less, a second order differential coefficient of the magnetic moment with respect to this magnetic field was always negative.

For each of these seven specimens, an entropy change $\Delta S(T, \Delta H)$ of the electron spin system due to the change in external magnetic field was calculated from magnetization measurement data by using the following equation. In each specimen, a peak appeared in the entropy change $\Delta S$ at a specific temperature (Tpeak) with respect to a change $\Delta H$ of an arbitrary magnetic field.

$$\Delta S(T, \Delta H) = \int_0^{\Delta H} \left(\frac{\partial M(T, H)}{\partial T}\right)_H dH$$

Figure 4:
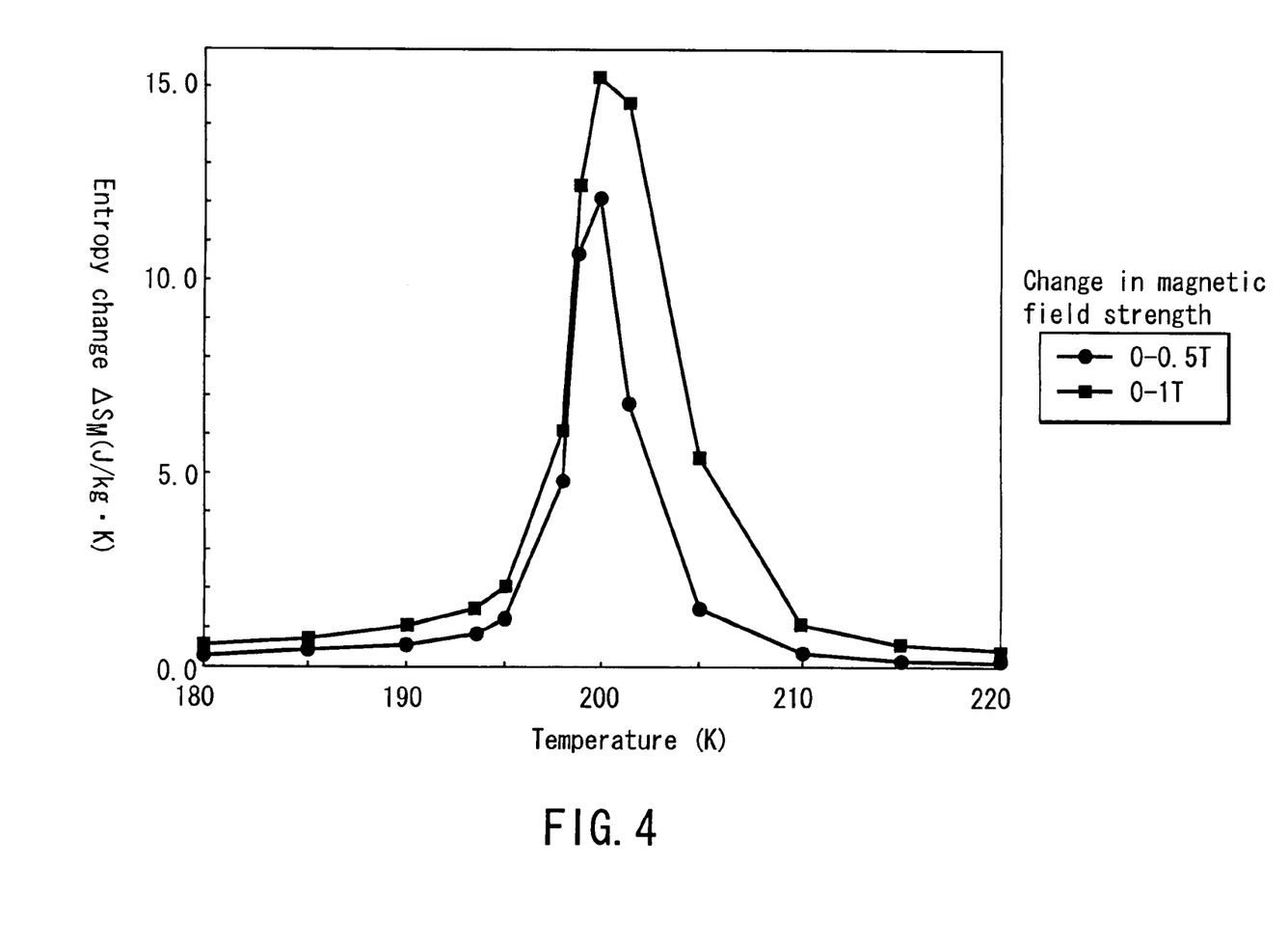
FIG. 4 shows the temperature dependency of the entropy change of the magnetic material (specimen 1) based on the present invention.

FIG. 4 shows the entropy change of specimen 1 as a function of the temperature. As shown in FIG. 4, when the magnetic field strength was changed from 0 to 0.5 tesla or from 0 to 1 tesla, a peak appeared in the entropy change at a temperature between about 195 K and about 210 K.

Table 1 shows the calculation result of an entropy change ($\Delta S_{max}$) with respect to the change in magnetic field strength $\Delta H$ at Tpeak (the temperature at which a peak appeared in the entropy change), for each of the specimens. For comparison, Table 1 also shows the entropy change of the electron spin system of Gd as a prototype of a magnetic material for magnetic refrigeration.

TABLE 1

Entropy change: $\Delta S_{max}[J/(K \cdot Kg)]$

| Change in magnetic field strength | Specimen No. | | | | | | | Remarks |
|---|---|---|---|---|---|---|---|---|
| $\Delta H$[tesla] | 1 | 2 | 3 | 4 | 5 | 6 | 7 | Gd |
| 0–0.1 | 1.7 | 1.6 | 0.9 | 1.3 | 0.21 | 0.23 | 0.34 | 0.43 |
| 0–0.2 | 4.6 | 3.2 | 1.8 | 2.5 | 0.41 | 0.45 | 0.72 | 0.87 |
| 0–0.3 | 8.2 | 5.1 | 2.7 | 3.7 | 0.64 | 0.66 | 1.07 | |
| 0–0.4 | 10.7 | 6.9 | 3.8 | 4.8 | 0.83 | 0.89 | 1.4 | 1.6 |
| 0–0.5 | 12.1 | 8.3 | 4.6 | 5.8 | 1.04 | 1.1 | 1.7 | |
| 0–0.6 | 13.1 | 9.6 | 5.4 | 6.5 | 1.2 | 1.3 | 2.0 | 2.2 |
| 0–0.8 | 14.5 | 11.5 | 6.6 | 7.6 | 1.4 | 1.6 | 2.5 | 2.7 |
| 0–1.0 | 15.2 | 12.6 | 7.4 | 8.4 | 1.6 | 1.8 | 3.0 | 3.2 |
| $T_{peak}$(K) | 200 | 207 | 230 | 205 | 250 | 240 | 285 | 295 |

$\Delta S_{max} = \Delta S(T_{peak}, \Delta H)$
$T_{peak}$: the temperature at which a peak is observed in the temperature dependency of the entropy change As can be seen from Table 1, large entropy changes were observed for a low magnetic field of 1 tesla or less in specimens 1 to 4, indicating that these specimens were much superior to Gd. In contrast, entropy changes measured in specimens 5 to 7 were equivalent to or smaller than Gd, showing that these specimens 5 to 7 were largely inferior to specimens 1 to 4.

As described previously, when magnetic refrigeration is actually performed using a magnetic material, not only the magnitude of the entropy change $\Delta S(T, \Delta H)$ due to the change ($\Delta H$) in the magnetic field, but also a temperature width ("effective temperature width") by which a peak appears in the entropy change is an important factor. As numerical value for comparison, the temperature widths of the individual specimens for $\Delta S(T, \Delta H=1$ tesla) and $\Delta S(T, \Delta H=0.5$ tesla) are presented below.

When the change in magnetic field strength $\Delta H$ is 1 tesla, the temperature widths of the peaks of the entropy changes of specimens 1 to 4 are as follows:
Specimen 1: approximately 190 to 210 K
Specimen 2: approximately 195 to 220 K
Specimen 3: approximately 215 to 245 K
Specimen 4: approximately 195 to 217 K When the change in magnetic field strength ΔH is 0.5 tesla, the temperature widths of the peaks of the entropy changes of specimens 1 to 4 are as follows:

Specimen 1: approximately 194 to 207 K
Specimen 2: approximately 197 to 218 K
Specimen 3: approximately 220 to 237 K
Specimen 4: approximately 196 to 218 K As described above, even when the change in magnetic field strength ΔH is 0.5 tesla, each of specimens 1 to 4 has a temperature width of 10 K or more and hence has no problem in practice.

In each of specimens 1 to 4 as mentioned above, when the temperature was higher than a characteristic temperature (Tcri), the state of electron spin configurations greatly changed by a relatively low magnetic field of 1 tesla or less, and the inflection point appeared on the magnetization curve. In addition, in each of theses specimens, an extremely large entropy change was observed in the electron spin system near the temperature at which the inflection point appeared on the magnetization curve.

Note that X-ray diffraction revealed that in each of specimens 1 to 4, the main phase was a cubic crystal structure, and an αFe phase slightly precipitated as the second phase.

EXAMPLE 2

Three types of magnetic materials having the following compositions were manufactured, and these materials were tested for their magnetization curves and entropy changes due to magnetic field changes. In the following specimens, specimens 11 and 12 are magnetic materials based on the present invention, and specimen 13 is a comparative example.

Specimen 11: $Fe_{67}Hf_{28}Ta_5$
Specimen 12: $Fe_{67}Hf_{27}Ta_6$
Specimen 13: $Fe_{67}Hf_{29}Ta_4$ After these materials having the above compositions were adjusted by arc melting, they were subjected to uniformization annealing in a vacuum at a temperature of 950° C. to 1,000° C. for about 100 hr, thereby manufacturing base alloys. From these base alloys, granular specimens were manufactured by using a plasma spray process. As a consequence, a large number of sphere particles having a long diameter of about 0.1 mm to about 0.3 mm were obtained. These specimens thus manufactured were tested for their magnetization curves.

Figure 5:
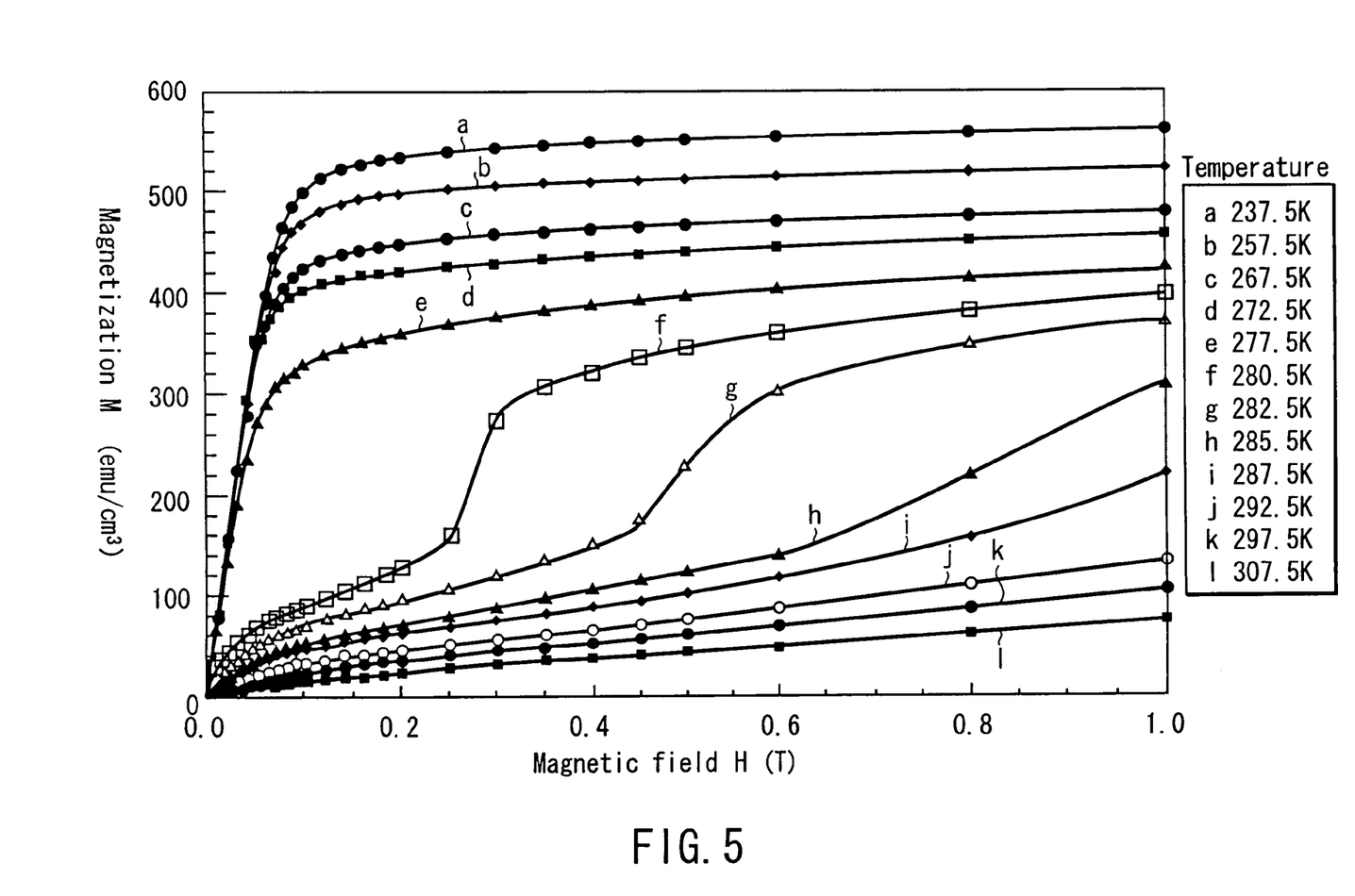
FIG. 5 is a graph showing examples of the magnetization curves of a magnetic material (specimen 11) based on the present invention.
Figure 6:
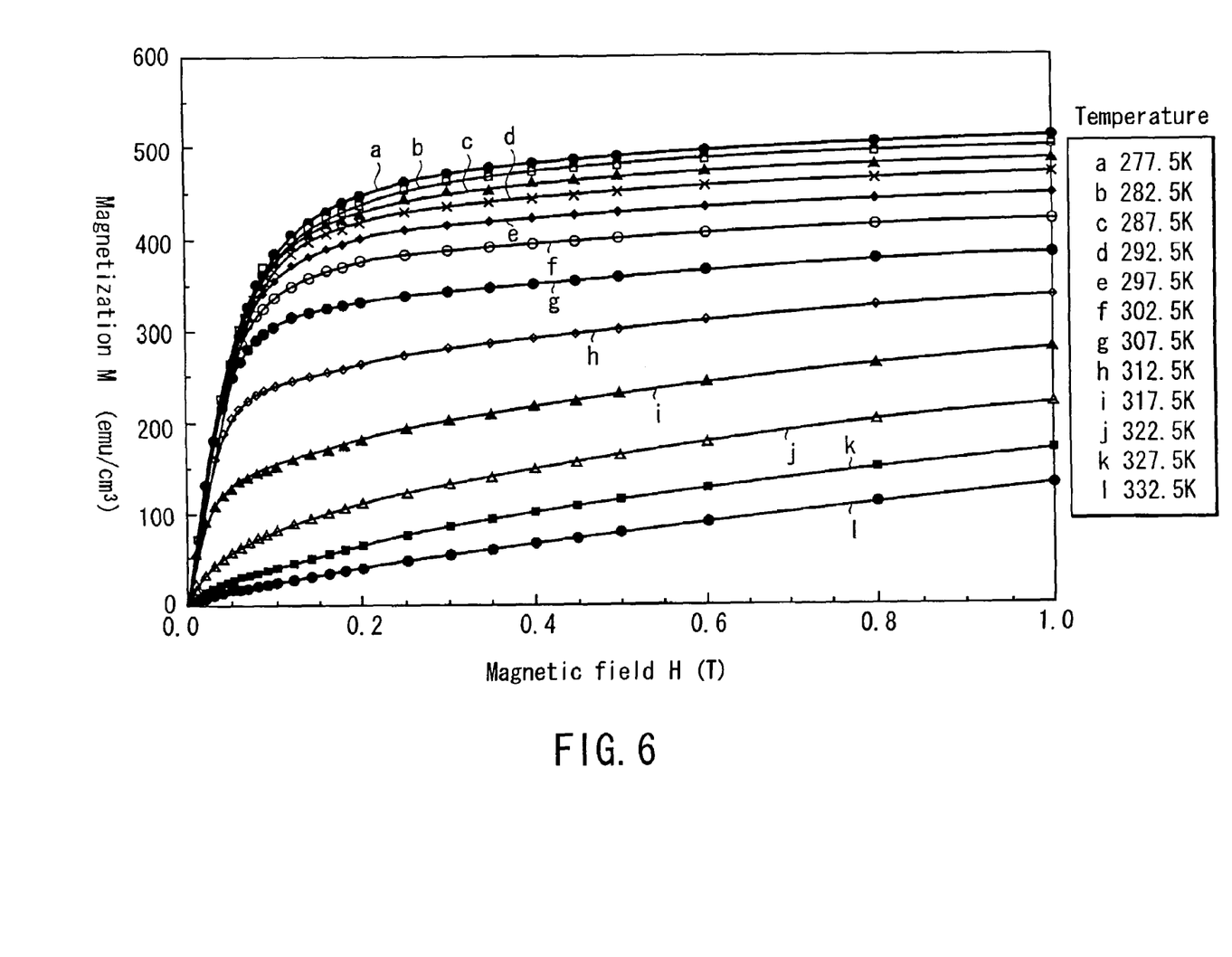
FIG. 6 is a graph showing examples of the magnetization curves of a magnetic material (specimen 13) used as a comparative example.

FIG. 5 shows the magnetization curves of specimen 11 at temperatures of 237.5 K to 307.5K. FIG. 6 shows the magnetization curves of specimen 13 at temperatures of 277.5 K to 332.5 K.

The magnetization curves of specimen 11 (FIG. 5) indicate that the magnetic moment abruptly increased by a relatively low external magnetic field in a temperature region lower than T=277.5 K, and, within the range of a magnetic field of 1 tesla or less, a second order differential coefficient of the magnetic moment with respect to the magnetic field was negative (upward convex shape) (symbols a to e in FIG. 5).

The shape of this magnetization curve largely changed near T=280 K. When T=280.5 K (symbol f) and 282.5 K (symbol g), the value of the magnetic moment was small with respect to a very low magnetic field of about 0.01 tesla. As the magnetic field increased, however, the magnetic moment abruptly increased near the magnetic field H=0.27 tesla and H=0.5 tesla, and an inflection point appeared on the magnetization curve. After passing through this inflection point, the increase in the magnetic moment reduced.

As the temperature was further raised as in the case of specimen 1 in Example 1, the value of Hc (the magnetic field with which an inflection point appears on the magnetization curve) increased, and the change in the magnetic moment near Hc reduced. When the temperature was higher than T=292.5 K (symbol j), the transition near Hc gradually disappeared (symbols j to l).

Note that similar magnetization curves were observed for specimen 12: near T=245 K, an inflection point appeared on the magnetization curve in a magnetic field of 1 tesla or less.

In contrast, similar to specimen 6 (comparative example) in Example 1, the magnetization curves of specimen 13 (FIG. 6) reveal that the value of the magnetic moment largely changed near the magnetic phase transition temperature, but, within the range of a magnetic field of 1 tesla or less, a second order differential coefficient of the magnetic moment was always negative with respect to this magnetic field, so there was no large change in the shape (upward convex shape) of the magnetization curve.

For each of these three specimens, an entropy change ΔS(T, ΔH) of the electron spin system due to the change in external magnetic field was evaluated in the same manner as in Example 1. Table 2 shows the calculation result of an entropy change (ΔSmax) with respect to the change in magnetic field strength ΔH at Tpeak (the temperature at which a peak appeared in the entropy change), for each of the specimens.

TABLE 2

| | Entropy change: $\Delta S_{max}[mJ/(K \cdot cm^3)]$ | | | |
|---|---|---|---|---|
| Change in magnetic field strength | Specimen No. | | | Remarks |
| ΔH[tesla] | 11 | 12 | 13 | Gd |
| 0–0.1 | 3.6 | 4.2 | 1.3 | 3.4 |
| 0–0.2 | 8.9 | 11.1 | 2.9 | 6.8 |
| 0–0.3 | 14.4 | 16.8 | 4.5 | |
| 0–0.4 | 19.4 | 21.2 | 6.0 | 12.6 |
| 0–0.5 | 24.0 | 24.9 | 7.4 | |
| 0–0.6 | 27.1 | 28.1 | 8.9 | 17.5 |
| 0–0.8 | 30.8 | 30.8 | 11.5 | 21.7 |
| 0–1.0 | 35.2 | 32.7 | 14.4 | 25.7 |
| $T_{peak}(K)$ | 282 | 245 | 315 | 295 |

$\Delta S_{max} = \Delta S(T_{peak}, \Delta H)$
$T_{peak}$: the temperature at which a peak is observed in the temperature dependency of the entropy change As can be seen from Table 2, large entropy changes were observed for a low magnetic field of 1 tesla or less in specimens 11 and 12, indicating that these specimens were much superior to specimen 13.

Furthermore, results analogous to those of specimens 12 and 13 described above were obtained for an Fe-T-Sc-based magnetic material containing about 67 atomic % of Fe and about 25 to 30 atomic % of Ti.

EXAMPLE 3

Two types of magnetic materials having the following compositions were manufactured, and these materials were tested for their magnetization curves and entropy changes due to the change in external magnetic field.

Specimen 21: $Mn_{63.4}Cr_{3.3}Sb_{33.3}$
Specimen 22: $Mn_{50}As_{35}Sb_{15}$

The raw materials in powdery form having the above compositions were mixed, sealed in a crucible, and kept at a temperature of 800° C. to 950° C., generating chemical reaction slowly for a long period (about 2 days for specimen 21, about 1 week for specimen 22). Specimen 21 and 22 were subjected to uniformization annealing in a vacuum at a temperature of 550° C. to 700° C. for about 100 hr. These specimens thus manufactured were tested for their magnetization curves.

Figure 7:
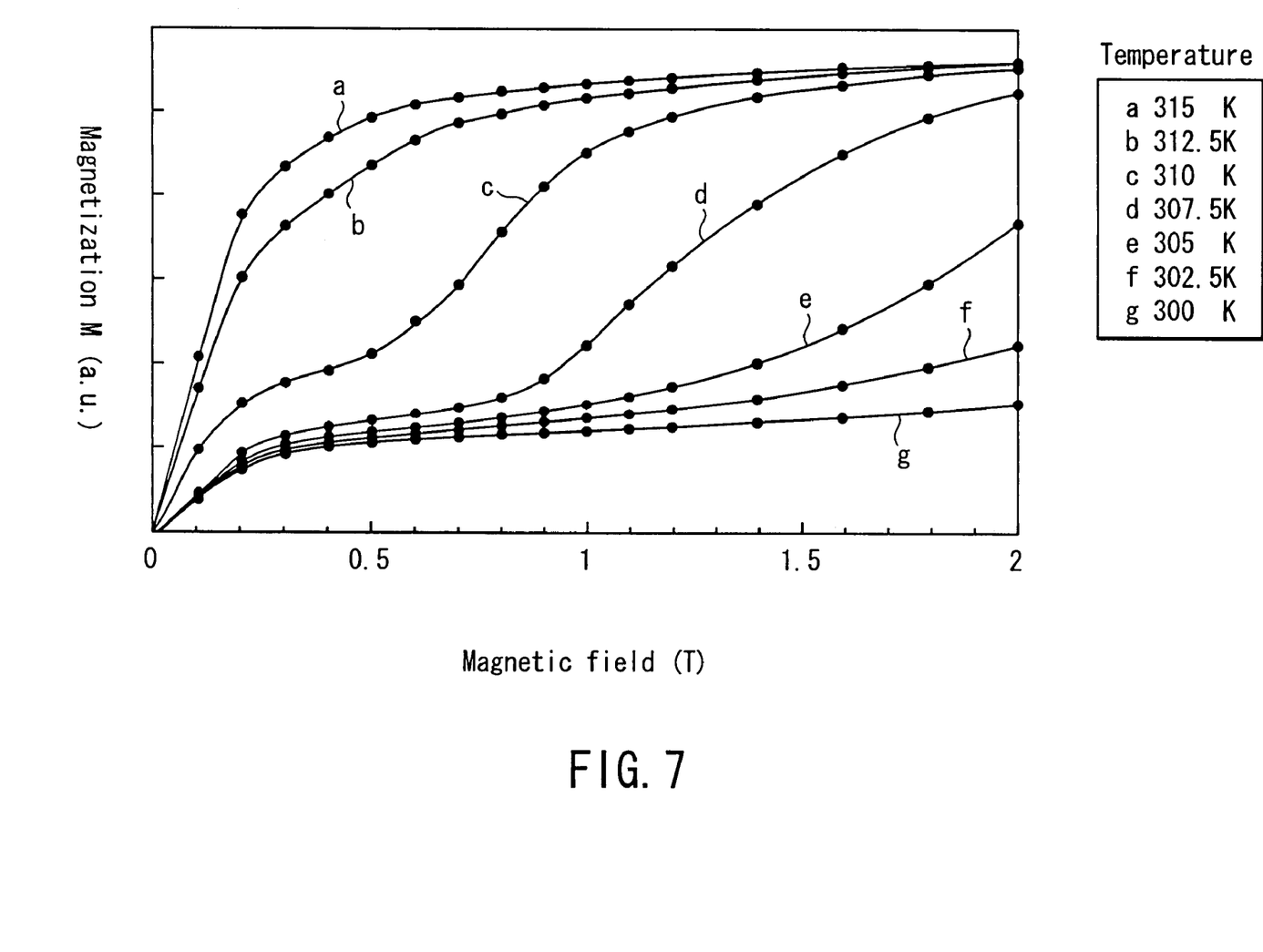
FIG. 7 is a graph showing examples of the magnetization curves of a magnetic material (specimen 21) base on the present invention.

FIG. 7 shows the magnetization curves of specimen 21 at temperatures of 300 K to 315 K. The magnetization curves of specimen 21 at temperature of 315 k indicated that, within the range of magnetic field of 1 tesla or less, a second order differential coefficient of the magnetic moment was always negative with respect to the magnetic field (upward convex shape) (symbols g in FIG. 7).

In the case of specimen 21, on the contrary to specimen 1 and 11, as the temperature was lowered, concave shape appeared in the magnetization curve.

When T=310 K (symbol c), within the range of magnetic field of 0.4 tesla or less, the magnetization curve exhibited upward convex shape. An inflection point appeared on the curve at magnetic field of near 0.4 tesla, and within the range of magnetic field from about 0.4 tesla to 0.8 tesla, the magnetization curve exhibited concave shape. As magnetic field strength increased further, another inflection point appeared on the curve at magnetic field of near 0.8 tesla, and within the range of magnetic field of about 0.9 tesla or above, the magnetization curve exhibited upward convex shape again.

As the temperature was lowered, the point at which the magnetization curve turns from concave shape to upward convex shape shifted to higher magnetic field strength. For the temperature of 307.5 K, 305 K, 302.5 K and 300 K (symbols d to g), the inflection point was observed on the curve at the magnetic field strength of approximately 1 tesla, 2 tesla, 2.6 tesla and 3.5 tesla, respectively.

In the case of specimen 22, the result was as follows. When T=232.5 K, an inflection point was observed on the magnetization curve at magnetic field of near 0.8 tesla, within the range of magnetic field of about 0.8 tesla or less, the magnetization curve exhibited concave shape, and within the range of magnetic field of 0.8 tesla or above, the magnetization curve exhibited upward convex shape.

In the case of specimen 22, within the range of temperature from 200 K to 230 K, and within the range of magnetic field of 1.0 tesla or less, the magnetization curve exhibited upward convex shape.

As the temperature was raised, when T=232.5, as described above, the magnetization curve turned from concave shape to upward convex shape. As the temperature was raised further, the inflection point on the curve shifts to higher magnetic field strength, and when T=240 K, the inflection point was observed on the curve at the magnetic field of 3.8 tesla.

For specimen 21 and 22, an entropy change $\Delta S(T, \Delta H)$ of the electron spin system due to the change in external magnetic field was evaluated in the same manner as in Example 1. For specimen 21 and 22, when the magnetic field strength increased from 0 tesla to 1 tesla, the peak in the entropy change was observed at near 311 K and 231 K respectively.

Table 3 shows the calculation result of an entropy change ($\Delta S_{max}$) per unit magnetic moment with respect to the change in magnetic field strength $\Delta H$ at Tpeak (the temperature at which a peak was observed in the entropy change), for each of the specimens.

TABLE 3

| Entropy change: $\Delta S_{max}[\times 10^{-3}$ mJ/(K · emu)] | | | |
|---|---|---|---|
| Change in magnetic field strength | Specimen No. | | Remarks |
| $\Delta H$[tesla] | 21 | 22 | Gd |
| 0–0.1 | 1.1 | 1.2 | 1.2 |
| 0–0.2 | 2.6 | 2.6 | 1.8 |
| 0–0.3 | 4.6 | 4.3 | |
| 0–0.4 | 6.8 | 6.0 | 2.7 |
| 0–0.5 | 9.0 | 7.4 | |
| 0–0.6 | 10.6 | 8.8 | 3.3 |
| 0–0.8 | 12.3 | 11.3 | 3.8 |
| 0–1.0 | 12.6 | 13.4 | 3.2 |
| $T_{peak}$(K) | 311 | 229 | 295 |

$\Delta S_{max} = \Delta S(T_{peak}, \Delta H)$
$T_{peak}$: the temperature at which a peak is observed in the temperature dependency of the entropy change As can be seen from Table 3, large entropy changes per unit magnetic moment were observed for a low magnetic field of 1 tesla or less in specimens 21 and 22, indicating that these specimens were much superior to Gd.

As described previously, when magnetic refrigeration is actually performed using a magnetic material, a temperature width ("effective temperature width") by which a peak appears in the entropy change is an important factor. As numerical value for comparison, the temperature widths of the individual specimens for $\Delta S(T, \Delta H=1$ tesla) and $\Delta S(T, \Delta H=0.5$ tesla) are presented below.

Specimen 21: approximately 304 to 315 K
Specimen 22: approximately 214 to 236 K

When the change in magnetic field strength $\Delta H$ is 0.5 tesla, the temperature widths of the peaks of the entropy changes of specimens 21 and 22 are as follows:

Specimen 21: approximately 305 to 316 K
Specimen 22: approximately 215 to 235 K

As described above, even when the change in magnetic field strength $\Delta H$ is 0.5 tesla, each of specimens 21 and 22 has a temperature width of 10 K or more and hence has no problem in practice.

(Arrangement of Magnetic Refrigeration System)

A magnetic refrigeration system using the magnetic material based on the present invention comprises a magnetic refrigeration chamber, inlet pipe, outlet pipe, and permanent magnet, as main constituent elements. The magnetic material is packed into the magnetic refrigeration chamber. A heat exchange medium is supplied into the magnetic refrigeration chamber through the inlet pipe and discharged through the outlet pipe. The permanent magnet is placed near the magnetic refrigeration chamber. By changing the position of this permanent magnet relative to the magnetic refrigeration chamber, a magnetic field is applied to and removed from the magnetic material. The heat exchange medium is cooled by heat exchanging with the magnetic material which is cooled when the magnetic field, is removed.

Preferably, the outlet pipe is divided into two piping systems. The first output pipe is used to extract, from the magnetic refrigeration chamber, the heat exchange medium used in pre-cooling of the interior of the magnetic refrigeration chamber. The second output pipe is used to extract, from the magnetic refrigeration chamber, the heat exchange medium cooled inside the magnetic refrigeration chamber. A driving unit is used to change the position of the permanent magnet relative to the magnetic refrigeration chamber. The permanent magnet is attached to this driving unit. In synchronism with a change in the relative position of this permanent magnet, the heat exchange medium outlet path from the magnetic refrigeration chamber is switched between the first and second outlet pipes, thereby forming a magnetic refrigeration cycle.

Preferably, the magnetic material is packed with a volume packing ratio of 50% to 75% into the magnetic refrigeration chamber.

In the above magnetic refrigeration system, the magnetic material is packed into the magnetic refrigeration chamber such that a space serving as a heat exchange medium passage is secured. If the packing ratio of the magnetic material in the magnetic refrigeration chamber is low, the magnetic material is stirred by the flow of the heat exchange medium when heat is exchanged between the magnetic material and the heat exchange medium, and these two materials collide into each other. This collision cracks the magnetic material and eventually crushes the magnetic material into fine particles. Fine particles produced by the crush of the magnetic material increases the pressure loss of the heat exchange medium and lowers the refrigeration capability. In the worst case, part of the pipe clogs with the fine particles, interfering with the flow of the heat exchange medium. To avoid this, therefore, the magnetic material is packed into the magnetic refrigeration chamber with a volume packing ratio of preferably 50% to 75%, and more preferably, 60% to 70%.

Preferably, the aforementioned magnetic material consists of particles which have a particle size (long diameter) of 0.1 to 1.5 mm, and in which 87 wt % or more of the particles have an aspect ratio of 2 or less.

To realize a high refrigeration capability, it is important that heat exchange between the magnetic material packed into the magnetic refrigeration chamber and the heat exchange medium is performed sufficiently. To sufficiently perform this heat exchange, the specific surface area of the magnetic material must be increased. Setting a small particle size is effective in increasing the specific surface area of the magnetic material of the present invention. However, if the particle size is too small, the pressure loss of the heat exchange medium increases. An optimum particle size must be chosen by taking this into account. The particle size of the magnetic material is preferably about 0.1 to 1.5 mm, and more preferably, about 0.2 to 0.8 mm.

Also, the particle shape of the magnetic material is preferably a smooth shape having no projection on the surface, e.g., a spherical shape or a spheroidal shape. By the use of a shape like this, it is possible to prevent the generation of fine particles caused by the crush of particles, and to suppress the increase in the pressure loss of the heat exchange medium.

For example, of the particles packed into the magnetic refrigeration chamber, 87 wt % or more of the particles preferably have a shape having an aspect ratio of 2 or less for the following reason. That is, the experiments were conducted by mixing odd-shaped particles having an aspect ratio of 2 or more into substantially spherical particles, the resultant particles were exposed to the flow of the heat exchange medium for a long time. In the case where the mixing amount of the odd-shaped particles was 13% or more, fine particles were produced, and the pressure loss of the fluid increased.

As the heat exchange medium, mineral oil, a solvent, water, or a solution mixture of these materials can be selected in accordance with the operating temperature region of the heat cycle. As the particle size of the magnetic material, an optimum particle size is desirably selected within the aforementioned range in accordance with the viscosity (surface tension) of the heat exchange medium used and the capability of the pump.

Figure 8:
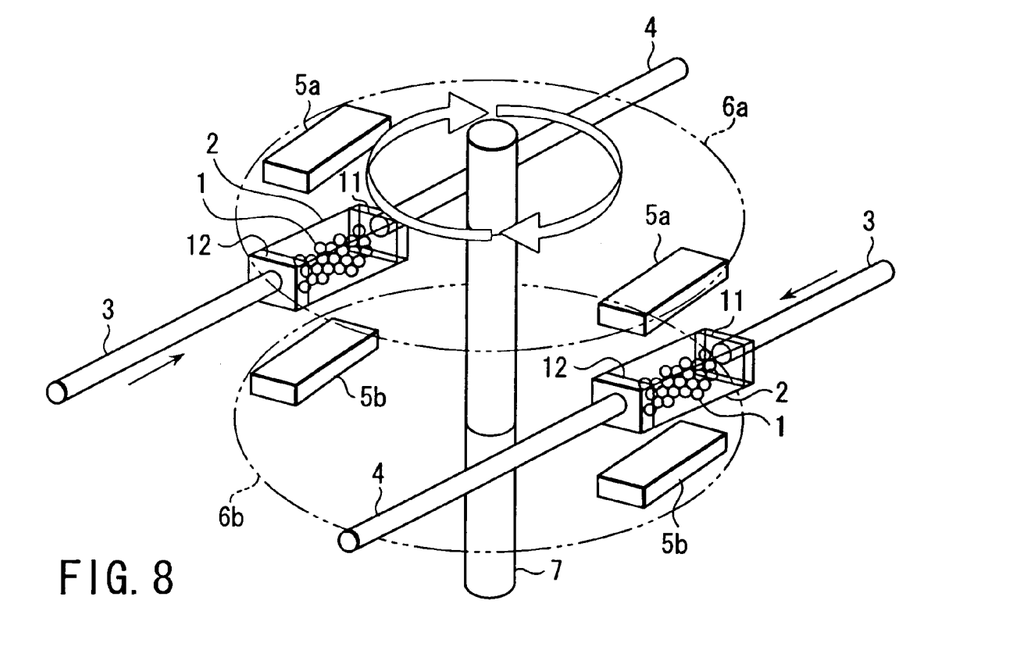
FIG. 8 is a schematic perspective view showing the arrangement of a magnetic refrigeration system using the magnetic material based on the present invention.
Figure 9:
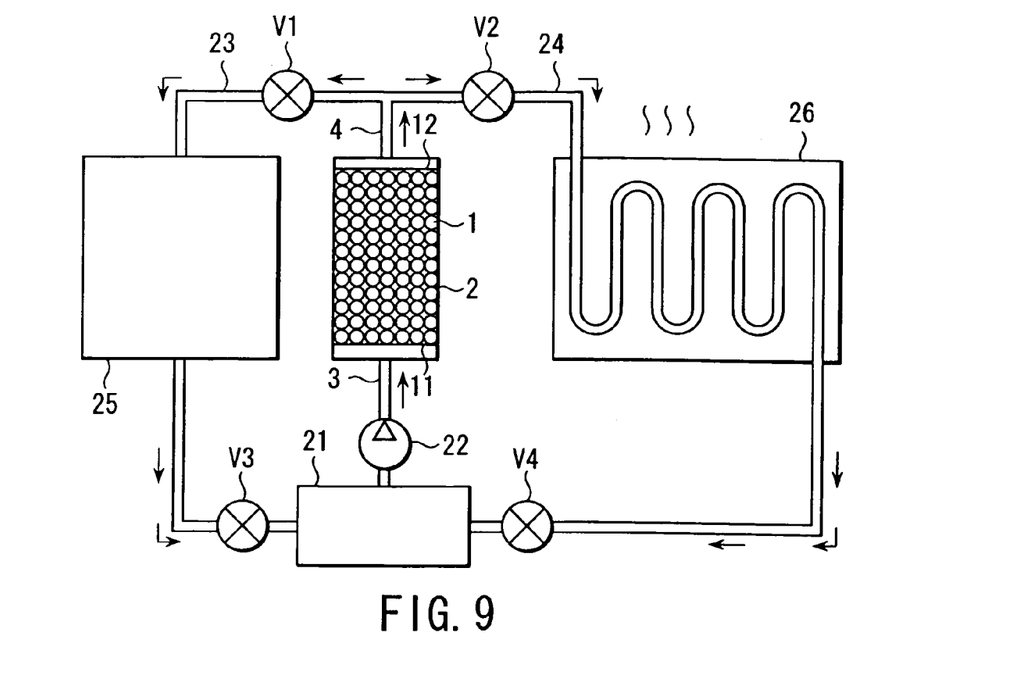
FIG. 9 is a schematic view showing the arrangement of a heat exchange medium circulating system in the magnetic refrigeration system using the magnetic material of the present invention.

FIG. 8 shows an outline of the arrangement of a magnetic refrigeration system using the magnetic material based on the present invention. FIG. 9 shows an outline of the arrangement of a heat exchange medium circulating system of this magnetic refrigeration system. Referring to FIGS. 8 and 9, reference numeral 1 denotes a magnetic material; 2, a magnetic refrigeration chamber; 3, an inlet pipe; 4, an outlet pipe; 5a and 5b, permanent magnets; 6a and 6b, rotation tables; 25, a low temperature consumption site; and 26, a radiator.

As shown in FIG. 8, the magnetic refrigeration chamber 2 has a cylindrical shape with a rectangular section. Mesh grids 11 and 12 are attached near the two end portions of this magnetic refrigeration chamber 2. The magnetic material 1 based on the present invention is packed between these mesh grids 11 and 12. This magnetic material 1 consists of spherical particles having an average diameter of 0.4 mm and is packed with a volume packing ratio of 62% into the magnetic refrigeration chamber 2. The mesh size and Cu wire diameter of the mesh grids 11 and 12 are #80 and 0.14 mm, respectively. The heat exchange medium inlet pipe 3 is connected to one end of the magnetic refrigeration chamber 2, and the heat exchange medium outlet pipe 4 is connected to the other end. In this embodiment, two magnetic refrigeration chambers 2 having the same shape are arranged parallel to each other.

The pair of rotation tables 6a and 6b sandwich the two magnetic refrigeration chambers 2. These rotation tables 6a and 6b are supported by a common rotation axis 7. This rotation axis 7 is positioned in the middle of the two magnetic refrigeration chambers 2. The permanent magnets 5a and 5b are held inside the circumferences of the rotation tables 6a and 6b, respectively. These permanent magnets 5a and 5b oppose each other and are connected via a yoke (not shown). Accordingly, a strong magnetic field space is formed in the gap between these paired permanent magnets 5a and 5b. In this embodiment, two pairs of permanent magnets 5a and 5b are arranged, with the rotation axis 7 sandwiched in the middle, so as to correspond to the two magnetic refrigeration chambers 2.

Whenever the rotation tables 6a and 6b are rotated 90°, the permanent magnets 5a and 5b repeatedly move close to and away from the magnetic refrigeration chamber 2. When each pair of permanent magnets 5a and 5b come closest to the side walls of the corresponding magnetic refrigeration chamber 2, this magnetic refrigeration chamber 2 is inside the magnetic field space formed between these permanent magnets 5a and 5b. So, the magnetic field is applied to the magnetic material 1 contained in the magnetic refrigeration chamber 2.

When the state in which the magnetic field is applied to the magnetic material 1 switches to the state in which the magnetic, field is removed, the entropy of the electron spin system increases, so the entropy transfers between the lattice system and the electron spin system. Consequently, the temperature of the magnetic material 1 lowers, and this low temperature is transmitted to the heat exchange medium to lower its temperature. The heat exchange medium whose temperature is thus lowered is discharged from the magnetic refrigeration chamber 2 through the outlet pipe 4 and supplied as a refrigerant to the low temperature consumption site (25: FIG. 9) on the outside.

As shown in FIG. 9, a storage tank 21 for storing the heat exchange medium is installed on the upstream side of the inlet pipe 3, and a pump 22 is placed midway along the inlet pipe 3. The outlet pipe 4 is divided into two piping systems after the magnetic refrigeration chamber 2 to form circulating lines. A valve V1, the low temperature consumption site 25, and a valve V3 are arranged midway along one circulating line (cooling line 23). The terminal end portion of this cooling line 23 is connected to the storage tank 21. A valve V2, the radiator 26, and a valve V4 are arranged midway along the other circulating line (pre-cooling line 24). The terminal end portion of this pre-cooling line 24 is connected to the storage tank 21.

The operation of this magnetic refrigeration system will be explained next. This magnetic refrigeration system is operated by repeating a pre-cooling process and a cooling process.

In the pre-cooling process, the valves V2 and V4 are opened with the valves V1 and V3 being closed, thereby circulating the heat exchange medium in the pre-cooling line 24. In this state, the permanent magnets (5a and 5b: FIG. 8) are approached to the magnetic refrigeration chamber 2. When the magnetic field is applied to the magnetic material 1, the temperature of the magnetic material 1 rises, and this high temperature is transmitted to the heat exchange medium to raise its temperature. The heat exchange medium thus heated is discharged from the magnetic refrigeration chamber 2 through the outlet pipe 4, introduced to the radiator 26 through the valve V2, and cooled in the radiator 26. The cooled heat exchange medium is returned to the storage tank 21 through the valve V4.

When the temperature of the magnetic material 1 in the magnetic refrigeration chamber 2 lowers to the vicinity of the temperature of the heat exchange medium supplied to the magnetic refrigeration chamber 2 through the inlet pipe 3, the valves V2 and V4 are closed to complete the pre-cooling process, and the cooling process is started.

In this cooling process, the permanent magnets (5a and 5b: FIG. 8) are moved away from the magnetic refrigeration chamber 2. The valves V1 and V3 are then opened to circulate the heat exchange medium in the cooling line 23. When the magnetic field is removed from the magnetic material 1, the temperature of this magnetic material 1 lowers, and this low temperature is transmitted to the heat exchange medium to lower its temperature. The heat exchange medium thus cooled is discharged from the magnetic refrigeration chamber 2 through the outlet pipe 4, and supplied to the low temperature consumption site 25 through the valve V1. After the temperature of the heat exchange medium is raised as it is used in this low temperature consumption site 25, the heat exchange medium returns to the storage tank 21 through the valve V3.

When the temperature of the magnetic material 1 in the magnetic refrigeration chamber 2 rises to the vicinity of the temperature of the heat exchange medium supplied to the magnetic refrigeration chamber 2 through the inlet pipe 3, the valves V1 and V3 are closed to complete the cooling process, and the pre-cooling process is started again.

A controller (not shown) of this magnetic refrigeration system controls the valves V1 to V4 in synchronism with the movement of the permanent magnets 5a and 5b, thereby alternately repeating the pre-cooling processing and the cooling process described above.

When the magnetic material of the present invention is used in near room temperature region, an inflection point appears on the magnetization curve with a relatively low magnetic field. In addition, near the temperature at which this inflection point appears on the magnetization curve, a large entropy change is observed in the electron spin system.

Accordingly, when this magnetic material of the present invention is used, magnetic refrigeration can be realized using a relatively low magnetic field by exchanging the entropy between the electron spin system and the lattice system near the above-mentioned temperature.

Also, by combining this magnetic material and permanent magnets, a small, simple, inexpensive magnetic refrigeration system can be configured without using any superconducting magnet.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A method of conducting magnetic refrigeration, comprising:
    applying a cyclic magnetic field change to a magnetic material serving as a working substance, wherein said magnetic material exhibits, in only a part of the temperature region from 200° K to 350° K, an inflection point at which the sign of the second derivative of magnetization with respect to an applied magnetic field changes from positive to negative, within the range of the strength of the magnetic field of not more than 1 tesla.

2. The method according to claim 1, wherein the magnetic material consists essentially of:
    a total of 60 to 96 atomic % of one or not less than two elements selected from the group consisting of Fe, Co, Ni, Mn and Cr; and
    a total of 4 to 40 atomic % of one or not less than two elements selected from the group consisting of Sc, Ti, Y, Zr, Nb, Mo, Hf, Ta and W.

3. The method according to claim 2, wherein said magnetic material consists essentially of:
    a total of 60 to 96 atomic % of one or not less than two elements selected from the group consisting of Fe, Co, Ni, Mn and Cr;
    a total of 4 to 40 atomic % of one or not less than two elements selected from the group consisting of Sc, Ti, Y, Zr, Nb, Mo, Hf, Ta and W; and
    a total of not less than 25 atomic % of one or not less than two elements selected from the group consisting of Ti, Zr, Nb and Hf.

4. The method according to claim 1, wherein said magnetic material consists essentially of:
    a total of 50 to 80 atomic % of one or not less than two elements selected from the group consisting of Fe, Co, Ni, Mn and Cr; and
    a total of 20 to 50 atomic % of one or not less than two elements selected from the group consisting of Sb, Bi, P and As.

5. The method according to claim 2, wherein the content of oxygen in the magnetic material is not more than 1 atomic %.

6. The method according to claim 3, wherein the content of oxygen in the magnetic material is not more than 1 atomic %.

7. The method according to claim 4, wherein the content of oxygen in the magnetic material is not more than 1 atomic %.

8. The method according to claim 1, wherein said magnetic material consists essentially of:

a total of 79 to 90 atomic % of one or not less than two elements selected from the group consisting of Fe, Co, Ni, Mn and Cr;

a total of 4 to 13 atomic % of one or not less than two elements selected from the group consisting of Si, C, Ge, Al, B, Ga and In; and a total of 6 to 8 atomic % of one or not less than two elements selected from the group consisting of Y, La, Ce, Pr, Nd, Sm, Eu, Gd, Tb, Dy, Ho, Er, Tm and Yb, wherein the content of Si in the magnetic material is more than 4 atomic %.

9. The method according to claim 1, wherein a ferromagnetic/antiferromagnetic interaction occurs at said inflection point.

10. The method according to claim 1, wherein, in a graph of entropy change $\Delta S(T, \Delta H)$ versus temperature of the magnetic material which produces a peak, the effective temperature width of the peak must be 3° K or more.

11. The method according to claim 10, wherein the effective temperature width of the peak must be 5° K or more.

12. The method according to claim 1, wherein said magnetic material consists essentially of:

a total of 50 to 96 atomic % of one or not less than two elements selected from the group consisting of Fe, Co, Ni, Mn and Cr;

a total of 4 to 43 atomic % of one or not less than two elements selected from the group consisting of Si, C, Ge, Al, B, Ga and In; and a total of 4 to 20 atomic % of one or not less than two elements selected from the group consisting of Y, La, Ce, Pr, Nd, Sm, Eu, Gd, Tb, Dy, Ho, Er, Tm and Yb, the magnetic material, at its inflection point within said temperature range, exhibiting a base width of at least 3° K of its peak of entropy change $\Delta S(T, \Delta H)$.

13. An apparatus for performing magnetic refrigeration, comprising:

a magnetic material packed into a magnetic refrigeration chamber and a permanent magnet placed near the magnetic refrigeration chamber, whereby in operation the magnetic material, serving as a working substance, is subjected to a cyclic magnetic-field change, and wherein said magnetic material exhibits, in only a part of the temperature region from 200° K to 350° K, an inflection point at which the sign of the second derivative of magnetization with respect to an applied magnetic field changes from positive to negative, within the range of the strength of the magnetic field of not more than 1 tesla.

14. The apparatus according to claim 13, wherein the magnetic material consists essentially of:

a total of 60 to 96 atomic % of one or not less than two elements selected from the group consisting of Fe, Co, Ni, Mn and Cr; and a total of 4 to 40 atomic % of one or not less than two elements selected from the group consisting of Sc, Ti, Y, Zr, Nb, Mo, Hf, Ta and W.

15. The apparatus according to claim 14, wherein said magnetic material consists essentially of:

a total of 60 to 96 atomic % of one or not less than two elements selected from the group consisting of Fe, Co, Ni, Mn and Cr;

a total of 4 to 40 atomic % of one or not less than two elements selected from the group consisting of Sc, Ti, Y, Zr, Nb, Mo, Hf, Ta and W; and a total of not less than 25 atomic % of one or not less than two elements selected from the group consisting of Ti, Zr, Nb and Hf.

16. The apparatus according to claim 13, wherein said magnetic material consists essentially of:

a total of 50 to 80 atomic % of one or not less than two elements selected from the group consisting of Fe, Co, Ni, Mn and Cr; and a total of 20 to 50 atomic % of one or not less than two elements selected from the group consisting of Sb, Bi, P and As.

17. The apparatus according to claim 14, wherein the content of oxygen in the magnetic material is not more than 1 atomic %.

18. The apparatus according to claim 15, wherein the content of oxygen in the magnetic material is not more than 1 atomic %.

19. The apparatus according to claim 16, wherein the content of oxygen in the magnetic material is not more than 1 atomic %.

20. The apparatus according to claim 13, wherein said magnetic material consists essentially of:

a total of 79 to 90 atomic % of one or not less than two elements selected from the group consisting of Fe, Co, Ni, Mn and Cr;

a total of 4 to 13 atomic % of one or not less than two elements selected from the group consisting of Si, C, Ge, Al, B, Ga and In; and a total of 6 to 8 atomic % of one or not less than two elements selected from the group consisting of Y, La, Ce, Pr, Nd, Sm, Eu, Gd, Tb, Dy, Ho, Er, Tm and Yb, wherein the content of Si in the magnetic material is more than 4 atomic %.

21. The apparatus according to claim 13, wherein a ferromagnetic/antiferromagnetic interaction occurs at said inflection point.

22. The apparatus according to claim 13, wherein, in a graph of entropy change $\Delta S(T, \Delta H)$ versus temperature of the magnetic material which produces a peak, the effective temperature width of the peak must be 3° K or more.

23. The apparatus according to claim 22, wherein the effective temperature width of the peak must be 5° K or more.

24. The apparatus according to claim 13, wherein said magnetic material consists essentially of:

a total of 50 to 96 atomic % of one or not less than two elements selected from the group consisting of Fe, Co, Ni, Mn and Cr;

a total of 4 to 43 atomic % of one or not less than two elements selected from the group consisting of Si, C, Ge, Al, B, Ga and In; and a total of 4 to 20 atomic % of one or not less than two elements selected from the group consisting of Y, La, Ce, Pr, Nd, Sm, Eu, Gd, Tb, Dy, Ho, Er, Tm and Yb, the magnetic material, at its inflection point within said temperature range, exhibiting a base width of at least 3° K of its peak of entropy change $\Delta S(T, \Delta H)$.

* * * * *